United States Patent [19]

Hirose et al.

[11] Patent Number: 4,780,775
[45] Date of Patent: * Oct. 25, 1988

[54] MODE SETTING ARRANGEMENT FOR USE IN VIDEO TAPE RECORDER

[75] Inventors: Kunio Hirose, Joyo; Tadatoshi Hukuta, Hirakata; Hiroshi Horiuchi, Neyagawa; Toyozo Urakami, Kobe; Minoru Yoshida, Neyagawa, all of Japan

[73] Assignee: Sanyo Electric Co., Ltd., Osaka, Japan

[ * ] Notice: The portion of the term of this patent subsequent to Jan. 21, 2003 has been disclaimed.

[21] Appl. No.: 768,390

[22] Filed: Aug. 22, 1985

Related U.S. Application Data

[62] Division of Ser. No. 405,557, Aug. 5, 1982, Pat. No. 4,566,047.

[30] Foreign Application Priority Data

Aug. 5, 1981 [JP] Japan .................. 56-123484

[51] Int. Cl.4 .............................. G11B 15/66
[52] U.S. Cl. ............................ 360/85; 360/95
[58] Field of Search ................. 360/85, 95, 84

[56] References Cited

U.S. PATENT DOCUMENTS

| | | | |
|---|---|---|---|
| 3,979,772 | 9/1976 | Umeda | 360/85 |
| 4,121,267 | 10/1978 | Hayashi | 360/85 |
| 4,138,699 | 2/1979 | Ura et al. | 360/85 |
| 4,357,639 | 11/1982 | Hama et al. | 360/85 |
| 4,408,236 | 10/1983 | Murata et al. | 360/85 |
| 4,437,129 | 3/1984 | Yoshida et al. | 360/85 |
| 4,566,047 | 1/1986 | Hirose et al. | 360/95 X |

FOREIGN PATENT DOCUMENTS 0028928 7/1980 Japan .

*Primary Examiner*—John H. Wolff
*Attorney, Agent, or Firm*—Armstrong, Nikaido Marmelstein & Kubovcik

[57] ABSTRACT

A mode setting arrangement for use in a video tape recorder includes a cam arrangement defined by first and second cams provided integrally and mounted on an axle and a spiral guide groove formed in said cam arrangement with the center of the spiral being at the center of the axle. A first lever is provided operatively in association with the first cam for moving a pinch roller, a second lever is provided operatively in association with the second cam for effecting the transmital of driving force to a reel for winding magnetic tape, and arm mechanisms are provided operatively in association with the spiral guide groove for effecting the extraction of magnetic tape from a cassette and extending the magnetic tape around a drum.

1 Claim, 12 Drawing Sheets

MODE SETTING ARRANGEMENT FOR USE IN VIDEO TAPE RECORDER

This is a division of application Ser. No. 405,557, filed Aug. 5, 1982, now U.S. Pat. No. 4,566,047, Jan. 21, 1986.

BACKGROUND OF THE INVENTION

1. Field of the invention

The present invention relates to a video tape recorder and, more particularly, to a mode setting arrangement for use in a video tape recorder of compact size.

2. Description of the Prior Art

The prior art video tape recorder is essentially bulky in size and complicated, because various lever mechanisms for tape cassette loading, reel shifting and pinch roller movement and for the other functions must be complicatedly operated to cause the recorder to be set in a selected mode of operation. Such a prior art tape recorder is disclosed, for example, in U.S. Pat. No. 4,121,267 to Hayashi, U.S. Pat. No. 4,138,699 to Ura et al., and U.S. Pat. No. 4,258,399 to Iijima et al.

However, in order to design and assemble an extremely compact size video tape recorder such as one capable of being installed in a video camera, an arrangement for setting a selected mode of operation must be simplified and made as compact as possible.

SUMMARY OF THE INVENTION

The present invention has been developed with a view to substantially solving the above described disadvantage and has for its essential object to eliminate such a complicated lever mechanism and other bulky and complicated mechanisms such as a plunger for effecting the pressure contact of pinch roller, and to provide a novel mode setting arrangement for a compact video tape recorder.

In accomplishing these and other objects, a mode setting arrangement according to the present invention comprises a cam arrangement which during its rotation changes the position of various elements provided operatively in association therewith to set up different mode of operations of the video tape recorder.

More particularly, a mode setting arrangement according to the present invention comprises: first lever means rotatably mounted on a pin, said first lever means carrying the pinch roller; a first cam member mounted on a pin and provided operatively in association with said first lever means for rotating said first lever means about said pin and, thus effecting the movement of the pinch roller among three positions which are, first pinch roller position in which the pinch roller is positioned inside the cassette mounted on a pair of reel bases, second pinch roller position in which the pinch roller is positioned closely adjacent to the capstan with the magnetic tape located between said pinch roller and said capstan, and third pinch roller position in which the pinch roller is held pressure contact with said capstan for tightly holding said magnetic tape between said pinch roller and said capstan; first arm mechanism rotatably mounted on a cylinder; first tape loading arrangement mounted on said first arm mechanism; second arm mechanism rotatably mounted on a cylinder; second tape loading arrangement mounted on said second arm mechanism; means movable relatively to the rotation of said first cam member, for providing a driving force through a transmitting means to each of said cylinders for effecting the simultaneous movement of said first and second tape loading arrangements between an initial position in which the first and second tape loading arrangement are located inside the cassette, and a loaded position in which the first and second tape loading arrangement are located approximately on opposite sides of the drum for extending the magnetic tape around said drum; second lever means movably provided and having an engageable means and brake shoe member; engaging means adapted for the engagement with said engageable means, said engaging means carrying a force transmission means for transmitting a driving force to one of said pair of reel bases when said engageable means engages said engaging means, and for stop transmitting a driving force to none of said pair of reel bases when said engageable means disengages from said engaging means; and a second cam member provided to move simultaneously with said first cam member and mounted on said pin, said second cam member provided operatively in association with said second lever means for moving said second lever means between a brake position in which said brake shoe member is held in contact with said pair of reel bases and said engageable means engages said engaging means, and a release position in which said brake shoe member is held apart from said pair of reel bases and said engageable means disengages from said engaging means.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which:

FIG. 5 is a cross-sectional view taken along a line V—V shown in FIG. 2a;

DESCRIPTION OF THE PREFERRED EMBODIMENTS

Figure 1:
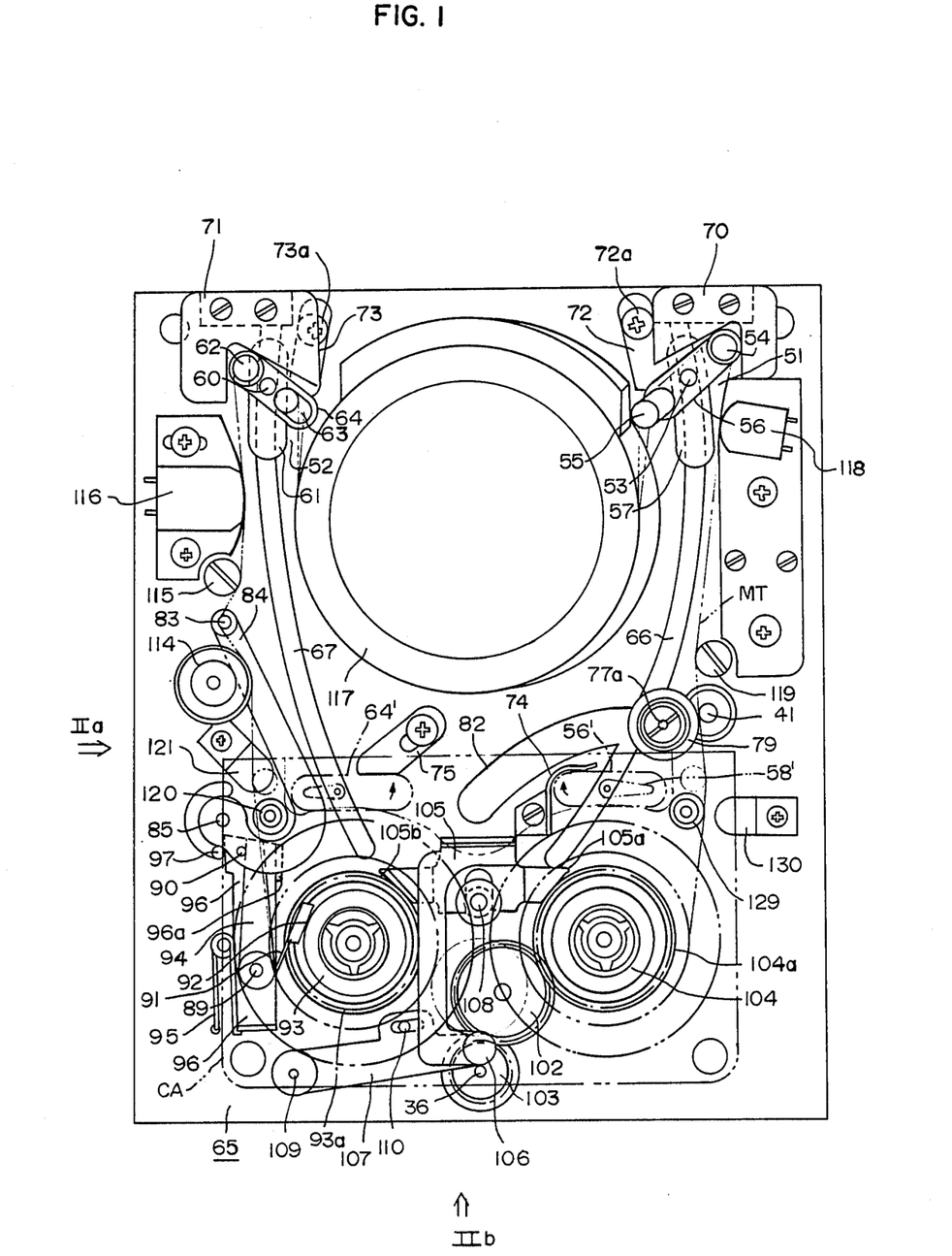
FIG. 1 is a top plan view of the mode setting arrangement of FIG. 1 in play/record mode.
Figure 2A:
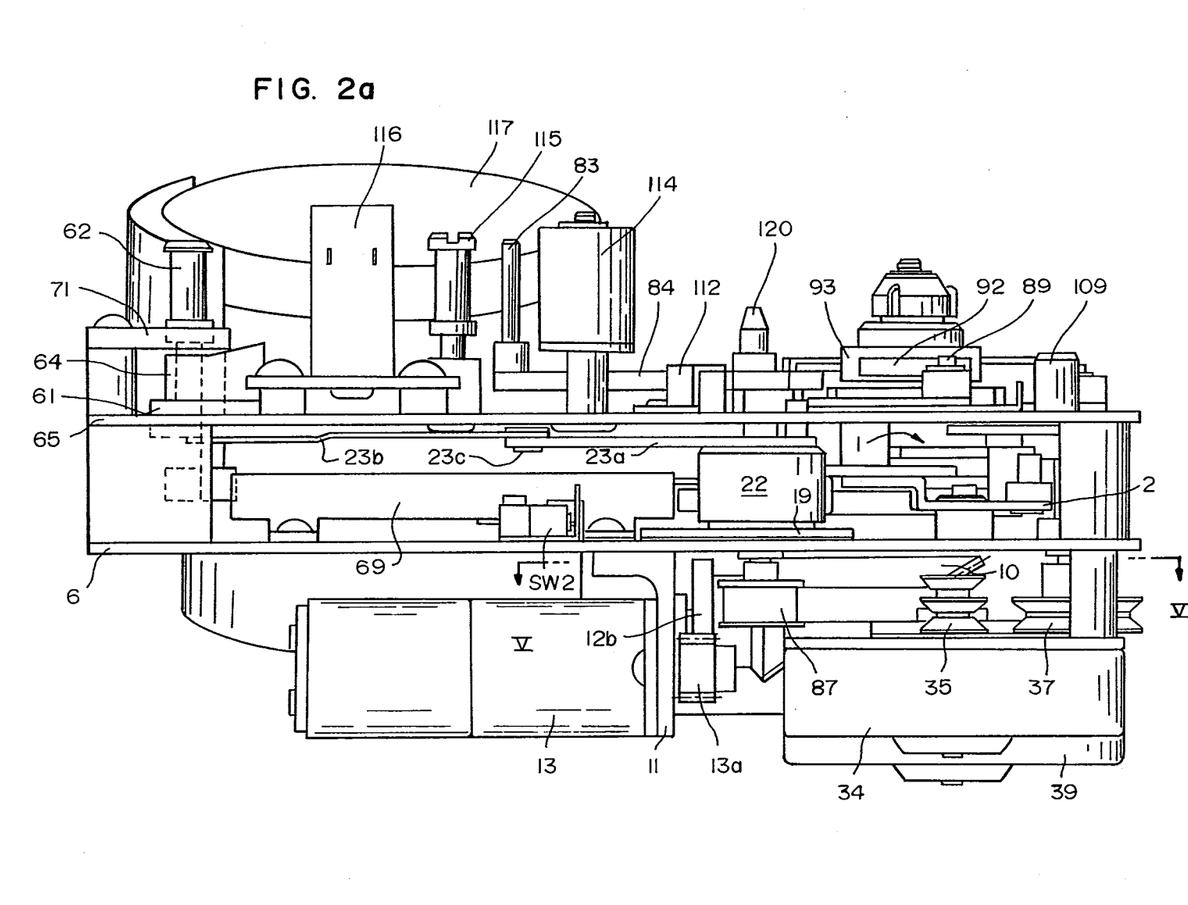
FIG. 2a is a side view in an enlarged scale and viewed in a direction indicated by an arrow IIa in FIG. 1.
Figure 2B:
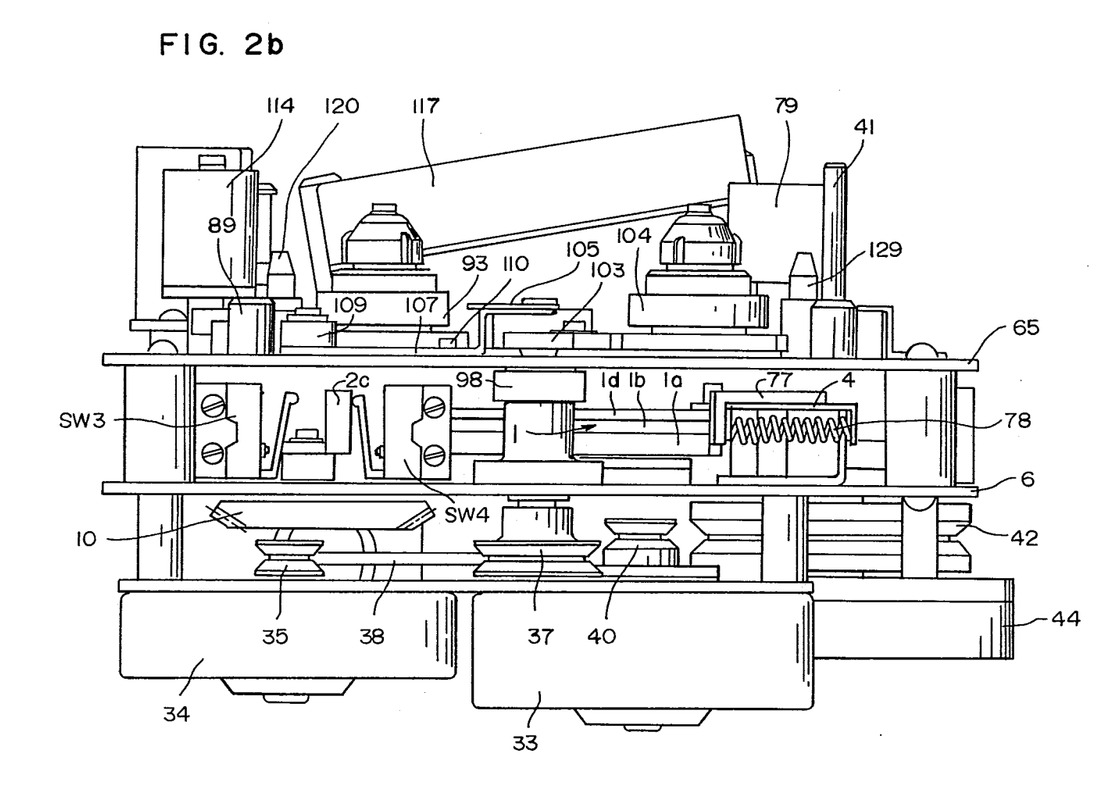
FIG. 2b is a side view in an enlarged scale and viewed in a direction indicated by an arrow IIb in FIG. 1.

Referring to FIGS. 1, 2a and 2b, a mode setting arrangement according to the present invention comprises upper and lower support plates 65 and 6 parallelly provided to each other with a predetermined space. A cam arrangement 1 is located in a middle compartment between the upper and lower support plates, and is provided for setting four different modes of operation of video tape recorder, which are stop mode, pause mode, play/record mode, and fast-forward/fast-rewind mode.

Figure 6:
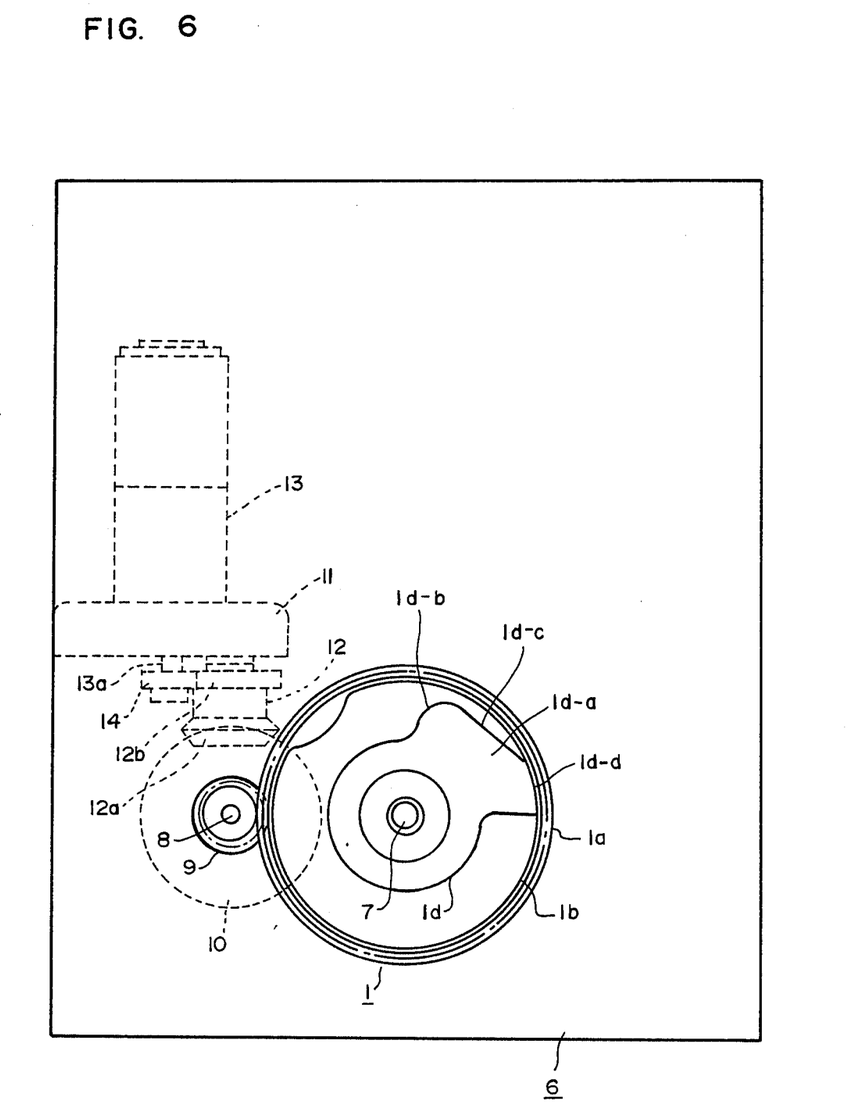
FIG. 6 is a diagrammatic view showing a relation between a cam arrangement and its driving device.
Figure 7:
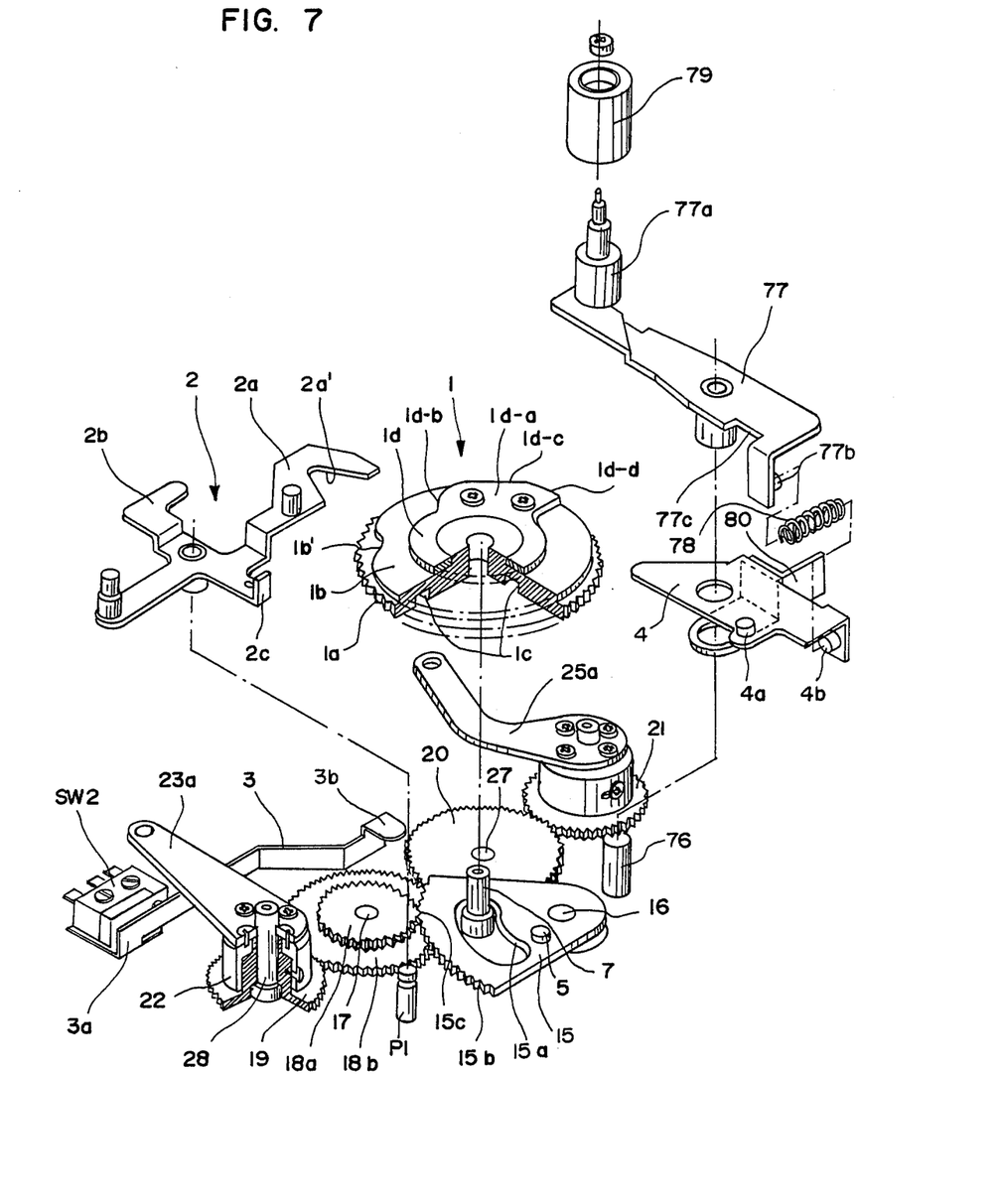
FIG. 7 is an exploded view showing the detail of cam arrangement and its associated parts.
Figure 11A:
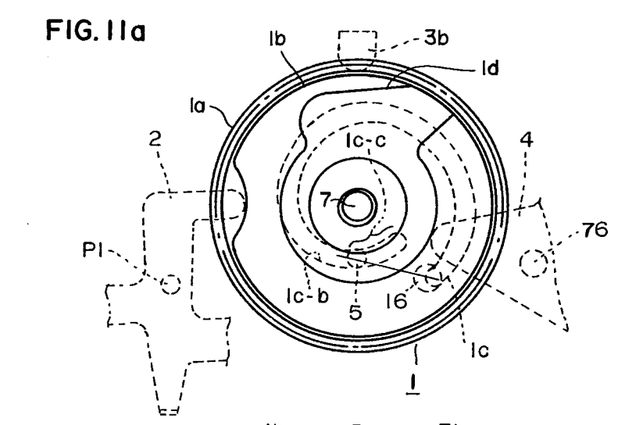
FIGS. 11a, 11b, 11c and 11d are diagrammatic views showing various positions of the cam arrangement to present stop mode, pause mode, play/record mode and fast-rewind and fast-forward mode, respectively, of a video tape recorder.
Figure 11B:
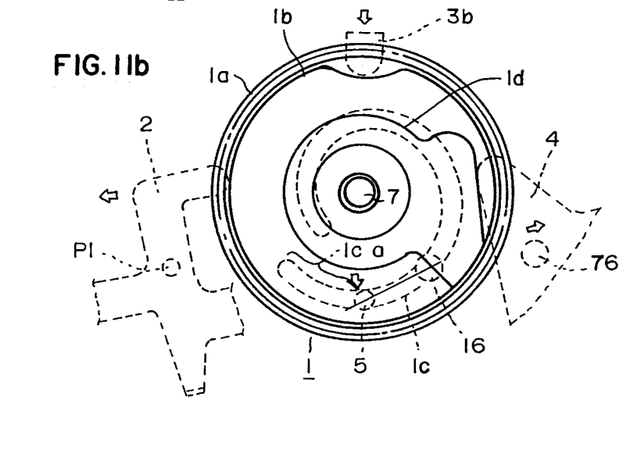

The cam arrangement 1, as best shown in FIG. 7 is defined by a gear 1a rotatably mounted on an axle 7 extending from the lower support plate 6, a first cam 1b integrally and coaxially mounted on upper surface of the gear 1a facing the upper support plate 65, a second cam 1d further mounted integrally on the first cam 1b, and a spiral guide groove 1c formed in the lower surface of the gear 1a. The first cam 1b has a circle configuration with one recess 1b' formed on its side. The second cam 1d mounted on the first cam 1b has a circle configuration about three quarters of 360° in angle and a projection part 1d-a in a remaining quarter. As best shown in FIG. 6, the projecting part 1d-a is defined by a curved edge 1d-b, a slope edge 1d-c, and a summit edge 1d-d which is spaced furthest from the axle 7 of the second cam 1d. As best shown in FIGS. 11a and 11b, the guide groove 1c is divided into three sections which are outer end section 1c-a, mid section 1c-b and inner end section 1c-c. Of the three sections, the mid-section 1c-b extends spirally about the axle 7 and connects between the outer and inner groove sections 1c-a and 1c-c, and the outer and inner groove sections 1c-a and 1c-c extend with a constant radius about the axle 7.

Next, a mechanism for driving the cam arrangement 1 is explained.

Referring to FIG. 6, the gear 1a engages a gear 9 rigidly mounted on a pin 8 which is rotatably mounted on the lower support plate 6. The pin 8 extends through the lower support plate 6 downwardly to the opposite side of plate 6 for rigidly receiving a bevel gear 10. The bevel gear 10 engages another bevel gear 12a which is coaxially provided with a gear 12b. The gears 12a and 12b are integrally provided to define a gear arrangement 12. The gear 12b engages a gear 14 which is rigidly mounted on a driving shaft of a loading motor 13. The loading motor 13 is of a type that can rotate in both directions and is operated by a signal obtained for a microcomputer (not shown) which receives signals from operation buttons (not shown) provided on a control panel (not shown) of the video tape recorder, and signals from micro-switches SW1, SW2, SW3, SW4 and SW5 which will be described in detail later. The loading motor 13 is secured to a plate 11 that extends downwardly and perpendicularly from the lower support plate 6.

By the above arrangement, the driving force from the loading motor 13 is transmitted to the cam arrangement 1.

Provided operatively in association with the first cam 1b of the cam arrangement 1 is an idler control lever 2 (FIGS. 3 and 4) pivotally mounted on a pin P1. The idler control lever 2 has three arms 2a, 2b and 2c, and is biased to rotate clockwise about the pin P1 by a spring 101. The first arm 2a controls the transmission of driving force and braking effect to reels of the cassette CA in manner which will be described later. The second arm 2b has a projection which is held in contact with the first cam 1b. When the projection of the second arm 2b engages with the recess 1b' formed in the first cam 1b, the lever 2 is rotated clockwise to a position as shown in FIG. 4, and when the projection of the second arm 2b disengages from the recess 1b', the lever 2 is rotated counterclockwise to a position shown in FIG. 3.

Figure 5:
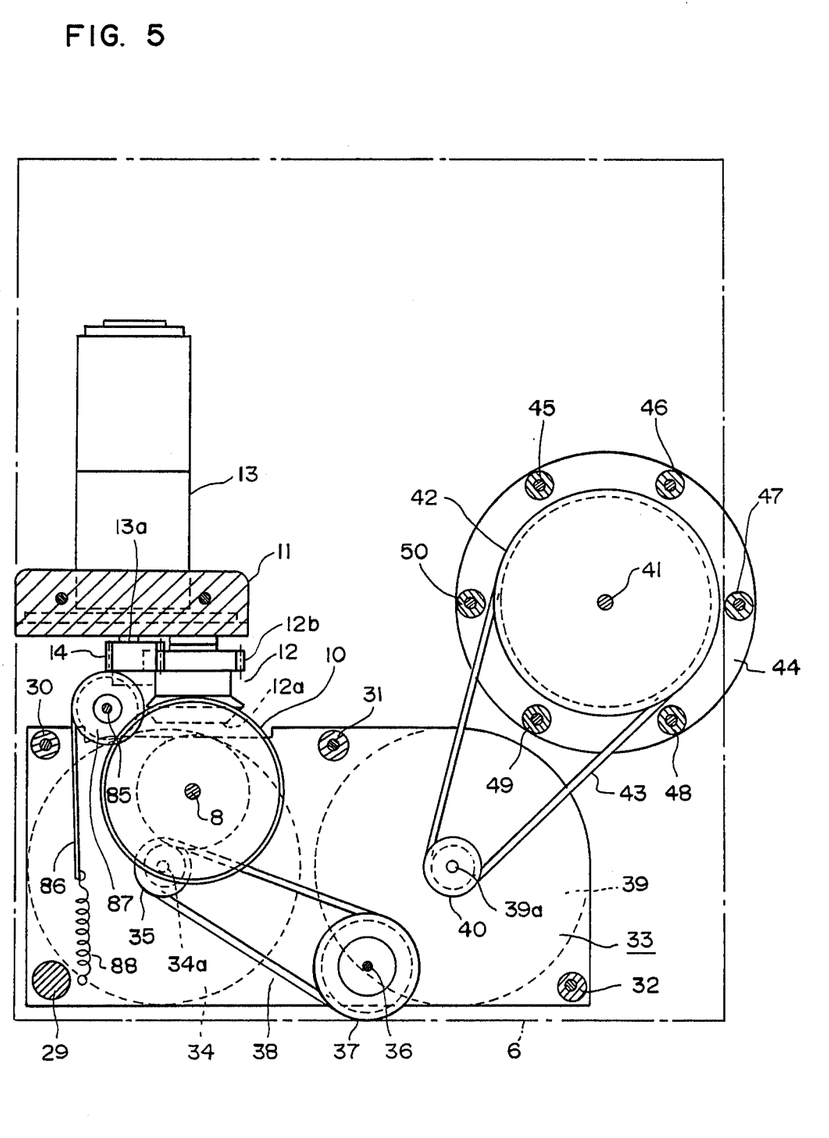

The first arm 2a has a hook portion 2a' adapted for the engagement with a pin 100 provided on a pivotal plate 98. The pivotal plate 98 is rotatably mounted on a shaft 36 of a gear 103, and the pivotal plate 98 is located between the gear 103 and a pulley 37 (FIG. 5) for effecting the rotation of the plate 98. As shown in FIG. 5, the pulley 37 is linked with another pulley 35 by an endless belt 38. Said another pulley 35 is fixedly mounted on a driving shaft of a reel motor 34 which is capable of being rotated in both directions and also being rotated in two different speeds. Referring again to FIG. 3, the pivotal plate 98 is provided with a pin 99 on which an idler gear 102 (FIG. 1) is rotatably mounted. The idler gear 102 engages with the gear 103. Therefore, the driving force of the reel motor 34 is transmitted through the pulley 35, belt 38, pulley 37 and gear 103 to the idler gear 102. The engagement between the gears 102 and 103 effect not only the transmission of driving force but also the pivotal movement of the plate 98 about the shaft 36 in a manner described below.

Figure 3:
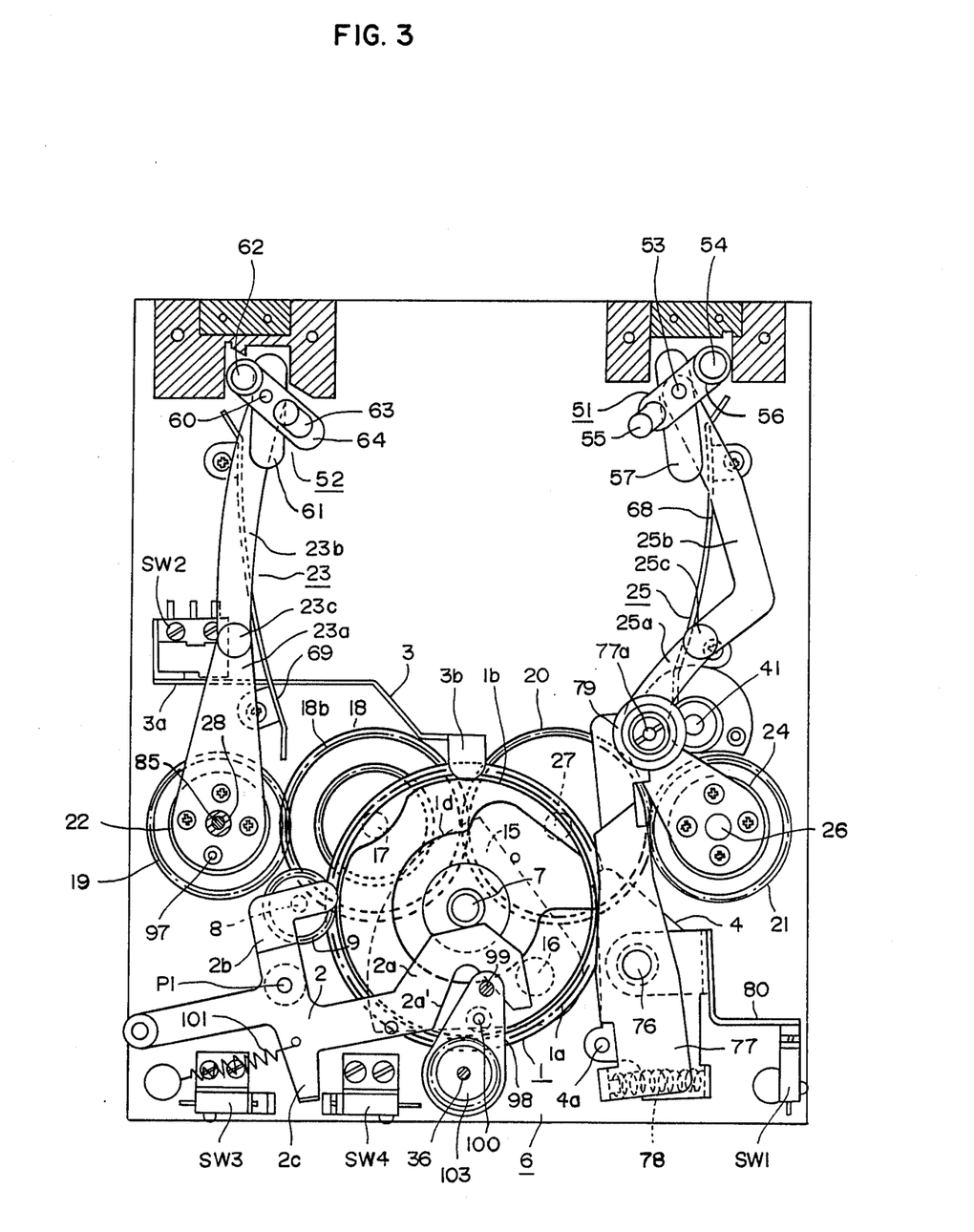
FIG. 3 is a top plan view of the mode setting arrangement of FIG. 1 in play/record mode with upper support plate being removed.
Figure 4:
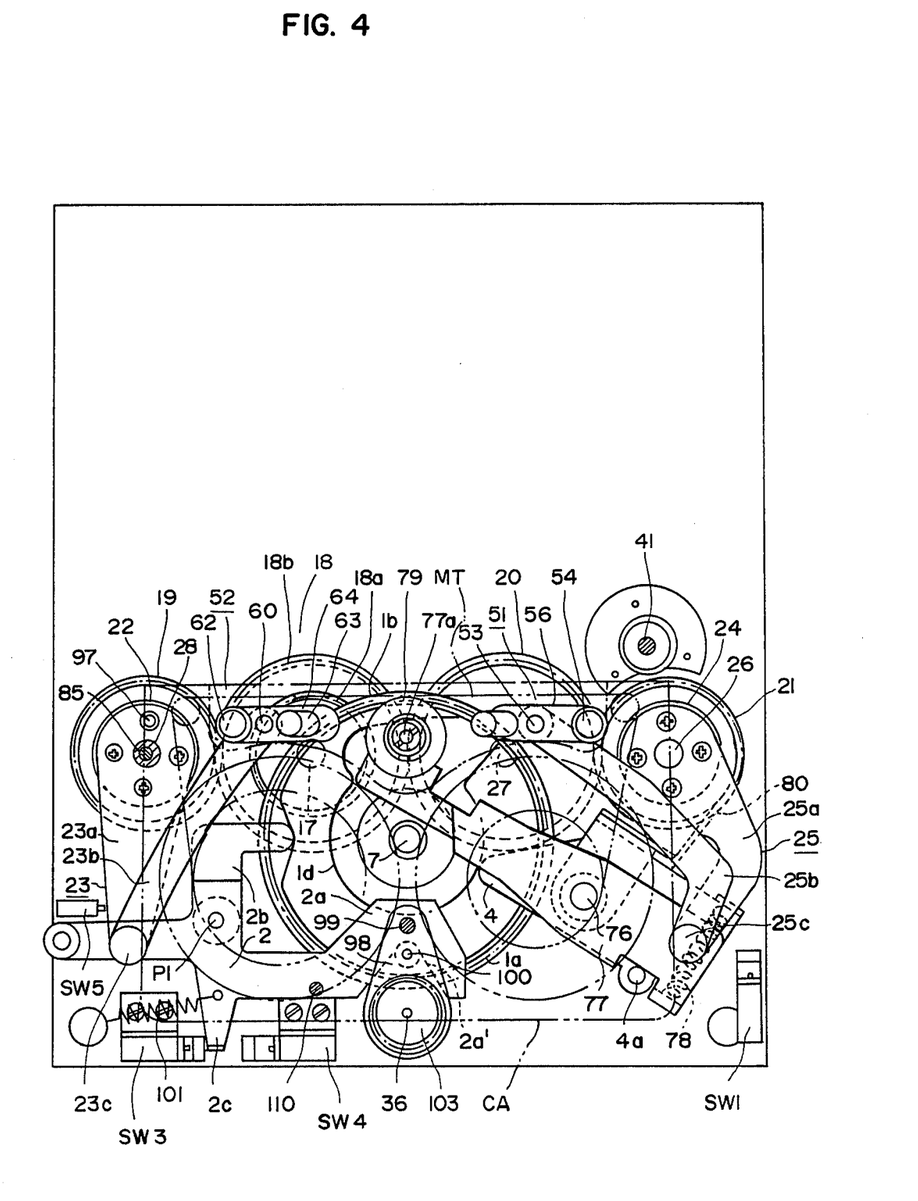
FIG. 4 is a top plan view of the mode setting arrangement of FIG. 1 in stop mode.

When the gear 103 rotates clockwise, during the hook portion 2a' being in the disengaged position with respect to the pin 100, as shown in FIG. 3, the pivotal plate 98 pivots clockwise until the idler gear 102 comes into engagement with a gear 104a (FIG. 1) which is coaxially provided with a take up reel base 104. Therefore, in this case, the driving force of the reel motor 34 is transmitted to the take up reel base 104.

On the contrary, when the gear 103 rotates counterclockwise, during the hook portion 2a' being in the disengaged position with respect to the pin 100, the pivotal plate 98 pivots counterclockwise until the idler gear 102 comes into engagement with a gear gear 93a (FIG. 1) which is coaxially provided with a supply reel base 93. Therefore, in this case, the driving force of the reel motor 34 is transmitted to the supply reel base 93.

When the lever 2 is rotated clockwise by the engagement of the projection of the first arm 2b into the recess 1b' of the first cam 1b, as shown in FIG. 4, the hook 2a' engages the pin 100 to prevent any pivotal movement of the plate 98. In this case, the idler gear 102 is forcibly held in a neutral position, i.e., between the gears 104a and 93a.

The second arm 2a also has a projection 110 which engages with an elongated groove formed in a lever 107 (FIG. 1). One end of the lever 107 is pivotally mounted on a pin 109 and the other end 106 thereof is pivotally connected to a lever 105. The lever 105 has a pair of slanted faces 105a and 105b each serving as a brake shoe. When the lever 2 is rotated counterclockwise, as shown in FIG. 3, the pin 110 moves upwordly and, therefore, the lever 107 is rotated counterclockwise about the pin 109. In this case, the lever 105 is raised upwardly, as shown in FIG. 1, resulting in a spaced relation between the slanted face 105a and the take up reel base 104, and also between the slanted face 105b and the supply reel base 93. Accordingly, the reel bases 104 and 93 are free from the braking effect.

On the contrary, when the lever 2 is rotated clockwise, as shown in FIG. 4, the pin 110 moves downwardly and, therefore, the lever 107 is rotated clockwise about the pin 109. In this case, the lever 105 is shifted down, guided by a pin 108, until the slanted faces 105a and 105b come into contact with the reel bases 104 and 93, respectively. Accordingly, the reel bases 104 and 93 receive the braking effect.

The third arm 2c of the lever 2 is positioned between a pair of micro-switches SW3 and SW4. When the lever 2 is rotated counterclockwise, as shown in FIG. 3, the third arm 2c actuates the micro-switch SW4 for the indication that the lever 2 is tilted in the position as shown in FIG. 3. Contrary, when the lever 2 is rotated clockwise, as shown in FIG. 4, the third arm 2c actuates the micro-switch SW3 for the indication that the lever 2 is tilted in the position as shown in FIG. 4.

Also provided operatively in association with the first cam 1b is an arm 3 (FIG. 3) having one end 3a fixedly connected to the lower support plate 6 and the other end 3b held in contact with the peripheral of the first cam 1b by the resiliency of the arm 3. A micro-switch SW2 is provided adjacent the one end 3a of the arm 3 so as to actuate the micro-switch SW2 when the end 3a of the arm 3 engages the recess 1b' of the first cam 1b.

Provided operatively in association with the second cam 1d is a pinch roller control lever 4 (FIGS. 3, 4 and 7) rotatably mounted on a pin 76. Also rotatably mounted on the pin 76 is a pinch roller support lever 77 having one end 77a rotatably receiving a pinch roller 79. The pinch roller 79 extends upwardly from the upper support plate 65 through an arcuate groove 82 (FIG. 1) formed in the upper support plate 65. The other end of the pinch roller support lever 77 at a portion 77b is mounted with an expansion spring 78 which is further mounted at a portion 4b of the lever 4. The expansion spring 78 provides such a force to the levers 4 and 77 as to separate the portions 4b and 77b. The separation, however, is restricted by an engagement between a pin 4a extending from the lever 4 and a recess 77c formed in the lever 77. The pinch roller control lever 4 further has an arm 80 extending radially outwardly from a side of the lever 4. A suitable biasing means (not shown) is mounted on the pin 76 for urging the lever 4, as well as the lever 7, counterclockwise about the pin 76 so as to hold the end of the lever 4 in contact with the peripheral of the second cam 1d.

When the pinch roller control lever 4 is held in contact with a circular portion of the second cam 1d, i.e., a portion other than the projecting part 1d-a, the lever 4 is rotated counterclockwise to a position as shown in FIG. 4. In this position, the lever 77 is so rotated about the pin 76 as to position the pinch roller 79 adjacent the axle 7. When the lever 4 slides over the curved edge 1d-b of the second cam 1d during the counterclockwise rotation of the cam arrangement 1, the lever 4 quickly rotates clockwise. Then, when the lever 4 slides over the slope edge 1d-c during the further counterclockwise rotation of the cam arrangement 1, the lever 4 is gradually rotated clockwise to further rotate the lever 77 clockwise. When the lever 4 is located about the mid of the slope edge 1d-c, the pinch roller 79 is positioned closely adjacent, but in a spaced relation with, a capstan 41. And thereafter, before the lever 4 comes into contact with the summit edge 1d-d of the second cam 1d, the lever 77 is so rotated as to make a contact between the pinch roller 79 and the capstan 41. When the lever 4 comes into contact with the summit edge 1d-d, as shown in FIG. 3, the lever 4 is further rotated clockwise to contract the expansion spring 78, resulting in a pressure contact between the pinch roller 79 and the capstan 41. When the pressure contact between the pinch roller 79 and the capstan 41 is established, the arm 80 actuates a micro-switch SW1 for the indication of such a pressure contact.

By the above arrangement, a predetermined pressure can be obtained between the pinch roller 79 and the capstan 41. Furthermore, the pinch roller 79 can be shifted from the position shown in FIG. 4 to the position shown in FIG. 3 with a quick motion without requiring much torque from the cam arrangement 1.

It is to be noted that the capstan 41 receives a driving force from a motor 39 through a pulley 40, an endless belt 43, and a fly wheel pulley 42. A reference numeral 44 designates a rotary detector containing a rotation detecting means supported under the fly wheel pulley 42 by six columns 45, 46, 47, 48, 49 and 50 for detecting the rotation of the fly wheel pulley 42.

It is also to be noted that the pinch roller 79 returns from the position shown in FIG. 3 to the position shown in FIG. 4 in a similar manner described above during the clockwise rotation of the cam arrangement 1.

Provided operatively in association with the guide groove 1c is a pin 5 (FIG. 7) extending perpendicularly from a sector shaped gear 15 engaging with a gear 18a. The sector shaped gear 15 is pivotally mounted on a pin 16 extending from the lower support plate 6. The sector shaped gear 15 has an arcuate groove 15a in which the axle 7 extends so as to allow the pivotal movement of the sector shaped gear 15 about the pin 16 between a first position in which a portion 15b of the sector shaped gear engages with the gear 18a and a second position in which a portion 15c engages with the gear 18a. First, the relation between the guide groove 1c and the sector shaped gear 15 is explained.

When the pin 5 is located anywhere in the inner end section 1c-c of the guide groove 1c (FIG. 11a or 11d), the sector shaped gear 15 is held in the first position mentioned above. When the cam arrangement 1 rotates counterclockwise, the pin 5 slide along a mid section 1c-b of the guide groove 1c. During such a counterclockwise rotation of the cam arrangement 1, the pin 5 is pushed in a radial direction from the axle 7, resulting in a counterclockwise rotation of the sector shaped gear 15. When the cam arrangement 1 is so rotated to locate the pin 5 anywhere in the outer end section 1c-a (FIG. 11b or 11c), the sector shaped gear 15 is held in the second position mentioned above.

The gear 18a (FIG. 7 or 8) is fixedly connected to a gear 18b. These gears 18a and 18b are integrally provided to each other to define a gear arrangement 18 which is rotatably mounted on a shaft 17. The gear 18b engages with a gear 19 which is fixedly connected to a cylinder 22. The gear 19 and the cylinder 22 are rotatably mounted on a hollow cylindrical shaft 28. Fixedly mounted on the cylinder 22 is a first arm 23a which is linked with a second arm 23b (FIG. 8) through a pivotal joint 23c. The first and second arms 23a and 23b define a left arm mechanism 23.

The gear 18b also engages a gear 20 rotatably mounted on a shaft 27. The gear 20 further engages a gear 21 which is fixedly connected to a cylinder 24. The gear 21 and the cylinder 24 are rotatably mounted on a shaft 26. Fixedly mounted on the cylinder 24 is a first arm 25a which is linked with a second arm 25b through a pivotal joint 25c. The first and second arms 25a and 25b define a right arm mechanism 25.

At the end of each of the left and right arm mechanisms 23 and 25, a tape loading arrangement for loading a tape around a drum 117 (FIG. 1) is provided. In the drawings, a tape loading arrangement provided on the left arm mechanism 23 is designated by a reference numeral 52, and that on the right arm mechanism 25 is designated by a reference numeral 51. Before describing the detail of the tape loading arrangement, a various arrangements provided around the drum 117 is explained below.

Referring to FIG. 1, the drum 117 is provided on its opposite sides with a pair of heads (not shown) for recording and reproducing video signal. The drum 117 is provided in an opening formed in the upper support plate 65 such that is axis is tilted, as shown in FIG. 2b, about 10 degrees with respect to a line extending perpendicularly from the upper support plate 65. Accordingly, as the drum 117 rotates the heads diagonally intersects the tape that runs around the drum 117. Formed in the upper support plate 65 on opposite sides of the drum 117 are a pair of elongated grooves 66 ad 67 for guiding the tape loading arrangements 51 and 52, respectively.

When viewed in FIG. 1, the groove 66 extends from a portion closely adjacent the take up reel base 104 through a narrow space between the drum 117 and a fixed magnetic head 118, for recording and reproducing audio signal and control signal, to the upper end of the support plate 65. Provided at the upper end of the elongated groove 66 is a V-shaped block 70 serving as a stopper for stopping the tape loading arrangement 51 to a loaded position described later. Also, a block 72 is provided adjacent the V-shaped block 70 for locating the tape loading arrangement in the proper angled relation with the drum 117. Provided adjacent the lower end and on the left side of the elongated groove 66 is a wall plate 74 for holding the tape loading arrangement 51 in its initial position described later.

Similarly, the groove 67 extends from a portion closely adjacent the supply reel base 93 through a narrow space between the drum 117 and an eraser magnetic head 116, for erasing the tape, to the upper end of the support plate 65. At the upper end of the groove 67, V-shaped block 71 and another block 73 are provided for stopping and positioning the tape loading arrangement 52 in a loaded position. And, at a portion adjacent the lower end of the elongated groove 67, a block 75 is provided for holding the tape loading arrangement 52 in its initial position.

Provided under the upper support plate 65 along the elongated groove 66 is an elongated guide wall 68 (FIG. 3). Likewise, an elongated guide wall 69 is provided under the upper support plate 65 along the elongated groove 67.

Next, the tape loading arrangements 51 and 52 are described. Since the tape loading arrangements 51 and 52 have a similar structure to each other, the tape loading arrangement 51 is described in detail below.

Figure 9:
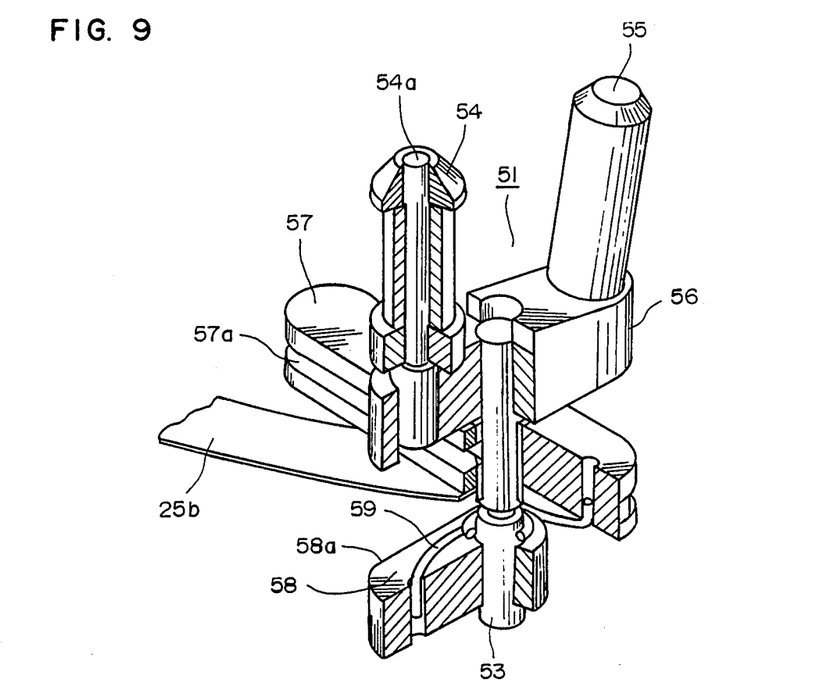
FIG. 9 is perspective view partly removed of a loading arrangement provided at the end of each arm mechanism.

Referring to FIG. 9, the tape loading arrangement 51 comprises a shaft 53 rotatably mounted at the free end portion of the second arm 25b. An elongated slide block 57 having a groove 57a therearound is also rotatably mounted on an intermediate portion of the shaft 53. The slide block 57 slides along the elongated groove 66 so that elongated slide block 57 is held in alignment with the direction to which the elongated groove 66 extends. At a lower end portion of the shaft 53, an elongated guide block 58 is mounted such that one end portion of the elongated guide block 58 is fixedly connected to the shaft 53 and the other end thereof extends perpendicularly from the shaft 53. And, at a upper end portion of the shaft 53, another elongated block 56 is mounted such that approximately the center portion of the elongated block 56 is fixedly connected to the shaft 53 and opposite ends of the elongated block 56 extends perpendicularly from the shaft 53 in opposite directions. One end of the block 56 is mounted with a tape guide post 54 having its axle 54a extending parallelly to the shaft 53. The other end of the block 56 is mounted with a roller 55 having its axis extending in a slanted relation by 12 degrees to the axle 54a such that the free end of the roller 55 is located further away from the axle 54a than its connected end. When viewed from the bottom of the shaft 53, the elongated block 58 extends in the same direction as the direction to which one end of the block 56 mounted with the tape guide roller 54 extends. A spring 59 is mounted on the shaft 53 with one end connected to the block 58 and the other end connected to the slider 57 for urging the blocks 56 and 58 clockwise about the shaft 53 with respect to a slider 57 which is held in a predetermined direction as it slides along an elongated groove 66.

During the movement of the tape loading arrangement 51 along the groove 66 by the right arm mechanism 25 in a manner described later, the block 58, particularly its face 58a (FIG. 9), abuts against the guide wall 68 to turn the elongated block 58 in alignment with the direction to which the guide wall 68 extends. Accordingly, the block 56, which is rigidly connected to the block 58 through the shaft 53, is also aligned with the direction to which the guide wall 68 extends.

The tape loading arrangement 52 for the left arm mechanism 23 has a structure similar to the tape loading arrangement 51. The difference is only in the direction to which the post slants, and in the biasing direction of the spring. More particularly, in the tape loading arrangement 52, a post 63, which corresponds to the roller 55 of the right tape loading arrangement 51, has its axis slanted by 12 degrees with respect to the axle of a roller 62 such that the free end of the post 63 is located closer to the roller 62 than its connected end. And, a spring, corresponding to the spring 59 of the right tape loading arrangement, is mounted for urging the blocks (only the block 64 is shown) counterclockwise about the shaft 60 with respect to a slider 61 which is held in a predetermined direction as it slides along an elongated groove 67.

Next, the movement of the tape loading arrangements 51 and 52 with respect to the rotation of the cam arrangement 1 is described.

Initially, the tape loading arrangements 51 and 52 are located in the initial position as shown in FIG. 4 for allowing the positioning of a cassette in the video tape recorder in a position indicated by a chain line CA. In this position, the magnetic tape MT extends adjacent the guide roller and post in each of the tape loading arrangement 51 and 52. When the tape loading arrangements 51 and 52 are located in the initial position, the pin 5 on the sector shaped gear 15 is engaged in the inner end section 1c-c of the guide groove 1c and, accordingly, the sector shaped gear 15 is in such a position as to engage its gear portion 15b with the gear 18a. In this case, the gears 19 and 21 are in the position to direct the respective arms 23a and 25a downwardly, as shown in FIG. 4, resulting in two fold of the arms 23a and 23b, and of the arms 25a and 25b. Accordingly, the tape loading arrangements 51 and 52 are maintained in their initial position. A micro-switch SW5 is provided on the lower support plate 6 adjacent the cylinder 22 for being switched on when the arms 23a and 23b are folded in two. Accordingly, the micro-switch SW5 produces a signal indicating the initial position of the tape loading arrangements 51 and 52.

When the tape loading arrangement 51 is in the initial position, the block 56 is held in contact with the wall plate 74, as indicated by a chain line 56' in FIG. 1, by the spring 59 mounted on the shaft 53. An arrow shown by a chain line 56' indicates the direction of urging force by the spring 59. Similarly, when the tape loading arrangement 52 is in the initial position, the elongated block 64 is held in a place indicated by a chain line 64' with a pressure contact between the block 64 and the block 75 as indicated by an arrow.

Then, when the cam arrangement 1 is rotated counterclockwise, the pin 5 engages in the mid section 1c–b of the guide groove 1c and, accordingly, the pin 5 is shifted away from the axle 7, resulting in counterclockwise rotation of the sector shaped gear 15 about the pin 16. When the sector shaped gear 15 rotates counterclockwise, the gear 21 is rotated clockwise, and the gear 19 is rotated counterclockwise.

Figure 8:
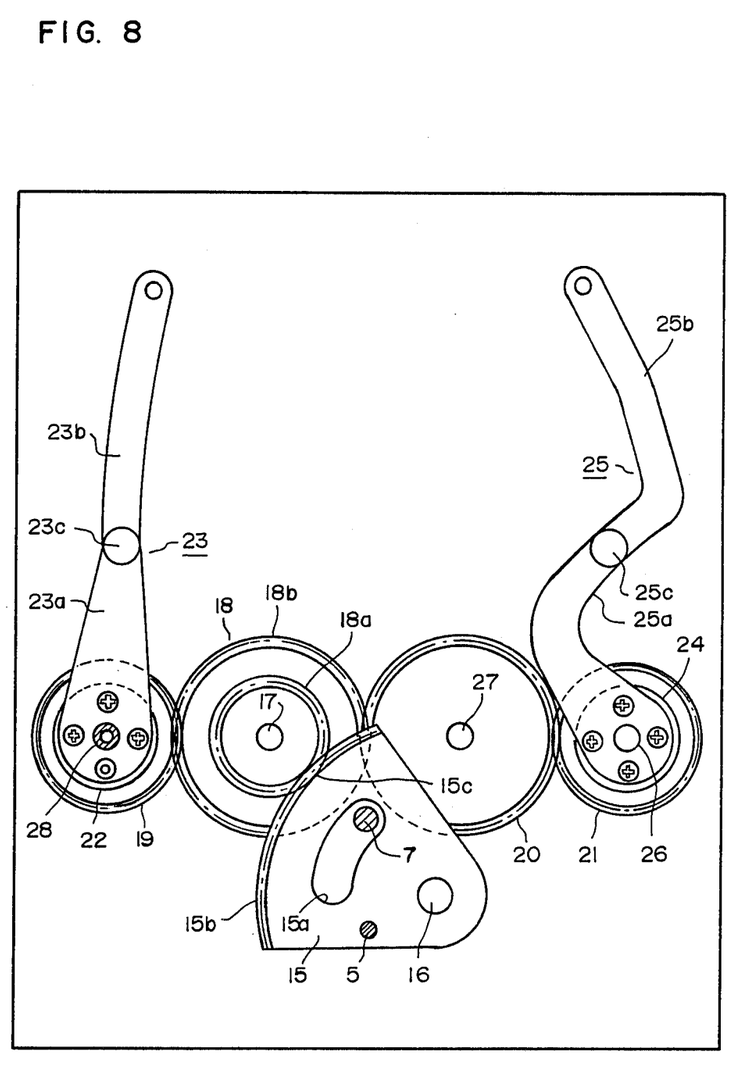
FIG. 8 is a diagrammatic view showing a relation between a sector shaped gear and a pair of arm mechanism to effect the extraction of magnetic tape.

Accordingly, the arm 25a, which has been directing downwardly, starts to rotate clockwise about the shaft 26 to direct upwardly, and, at the same time, the arm 23a starts to rotate counterclockwise about the shaft 28 to direct upwardly, as shown in FIG. 8. The description hereinbelow is directed particularly to the right arm mechanism 25. During the clockwise rotation of the arm 25a, the other arm 25b stretches straight forward and, accordingly, the tape loading arrangement 51 slides along the groove 66 upwardly. More particularly, at the beginning of the stretch, the elongated block 56 disengages from the wall plate 74 against the spring 59. When the elongated block 56 is about to disengage from the wall plate 74, the elongated block 56 aligns with the groove 66 and, accordingly, the elongated block 58 (Its position is shown by a chain line 58' in FIG. 1.) also aligns with the groove 66 such that its free end directs towards V-block 70. By the disengagement of the block 56, the guide roller 54 pulls out the magnetic tape MT from the cassette CA.

When the elongated block 56 disengages from the wall plate 74, the biasing force of the spring exerts on blocks 56 and 58 to rotate clockwise. However, because of the contact between the block 58 and the elongated guide wall 68, the blocks 56 and 58 are both maintained in alignment with the groove 66. Therefore, during the movement of the tape loading arrangement 51 along the intermediate portion of the groove 66, the elongated block 56 is maintained in alignment with the groove 66. In this manner, it is possible to move the elongated block 56 through the narrow space between the drum 117 and the fixed magnetic head 118.

Then, before the pin 5 reaches the outer section 1c–a, that is, before the sector shaped gear 15 is rotated counterclockwise to engage the gear portion 15c with the gear 18a, the tape loading arrangement 51 is so moved upwardly as to locate the guide block 58 past the guide wall 68, causing the blocks 56 and 58 to rotate clockwise by the spring 59. However, at this moment, since the elongated block 58 is placed in the V-shaped block 70, the blocks 56 and 58 rotate clockwise only for a small degrees to terminate the block 58 in a loaded position as shown in FIG. 1. A precise adjustment of the degree of the elongated block 56 can be effected by the block 72. At this moment, the arms 25a and 25b are stretched straight forward.

When the arms 25a and 25b are stretched straight forward, a predetermined pressure is applied between the elongated block 56 and the V-shaped block 70, because the length of the stretched arms 25a and 25b is made a little longer than the length necessary to advance the tape loading arrangement to the loaded position, and, at least one of the arms 25a and 25b has some flexibility to produce a spring effect when it is bent in a shape of bow.

It is to be noted that the arms 25a and 25b are so bent as to avoid any contact with the capstan 41.

It is also to be noted that the tape loading arrangement 52 provided on the left arm mechanism 23 operates in a similar manner described above relatively to the rotation of the cam arrangement 1. Accordingly, when the tape loading arrangements 51 and 52 are shifted to the loaded position, the magnetic tape MT extends around the drum 117, as indicated by a chain line shown in FIG. 1. In order to provide a predetermined tension to the extended magnetic tape MT, a tension lever 84 (FIG. 1) having a J-shape configuration is provided. A detail of the tension lever 84 and its associated parts is described below.

One end of the tension lever 84 is provided with a guide pin 83 and the other end thereof is fixedly connected to a shaft 85 which coaxially and rotatably extends through the hollow cylindrical shaft 28. The shaft 85 is also fixedly mounted with a pulley 87 (FIG. 5) on which a string 86 is wound. The string 86 is connected to a spring 88 so as to urge the pulley 87 counterclockwise and, thus urging the tension lever 84 counterclockwise about the shaft 85. A groove having a half-circle configuration about the shaft 85 is formed in the upper support plate 65 so as to allow a contact between a pin 97 extending from the arm 23a and a lever 96. The tension lever 84 has a pin 90 fixedly mounted thereon and extending downwardly for the engagement with the lever 94. The lever 94 carrying a brake plate 91 with a brake shoe 92, is rotatably mounted on a shaft 89. Also rotatably mounted on the shaft 89 is a plate 96 which is biased in counterclockwise direction by a hair pin spring 95. One end of the plate 96 is provided with a tongue 96a for the engagement with the plate 94. Therefore, the biasing force of the hair pin 95 is transmitted through the plate 96, tongue 96a to the plate 94, causing the plate 94 to rotate counterclockwise.

When the arm mechanism 23 is folded in two to located the tape loading arrangement 52 in its initial position, the pin 97 extending from the arm 23a is located at the upper end of half-circle groove. Therefore, by the biasing force of the hair pin spring 95, the plate 94 rotates counterclockwise to separate the brake shoe 92 away from the supply reel base 93 and, at the same time, to push the pin 90 leftwardly, when viewed in FIG. 1. Accordingly, the tension lever 84 rotates clockwise against the biasing force of the spring 88 for placing the guide pin 83 approximately at a position between chain line portions 64' and 58'.

When the arm mechanism 23 is so stretched as to locate the tape loading arrangement 52 close to its loaded position, the pin 97 engages rounded end portion of the tension lever 84 to rotate the tension lever 84 counterclockwise to the position as shown in FIG. 1, and, at the same time, the pin 90 pushes the plate 94 clockwise about the shaft 89 to make a contact between the brake shoe 92 and the supply reel base 93. Accordingly, the pulled out tape from the cassette extends with a predetermined tension.

Figure 10:
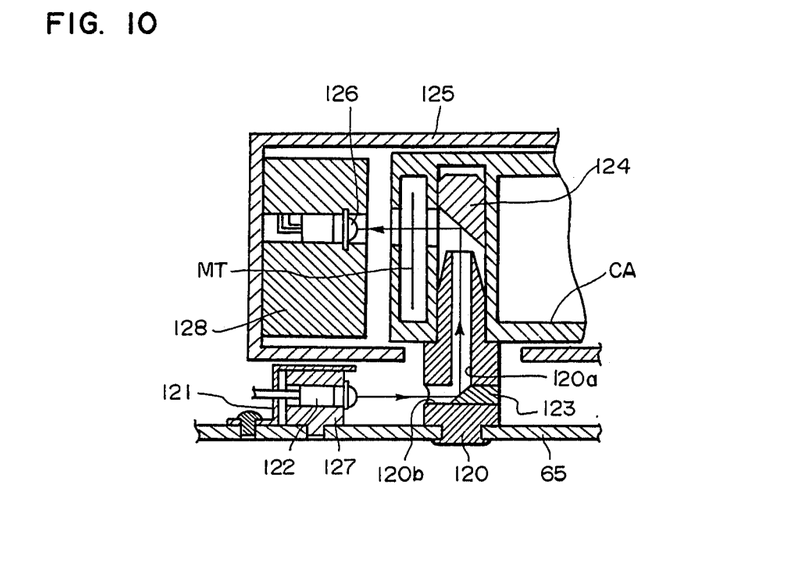
FIG. 10 is a cross-sectional view showing a tape end detecting device.

The arrangement according to the present invention further includes a device for detecting opposite ends of the magnetic tape. The tape end detecting device comprises a pin 120 mounted adjacent the J-shaped tension lever 84. As shown in FIG. 10, the pin 120 has an elongated opening 120a formed along its axis and another elongated opening 120b along a direction perpendicular to the axis. At the corner of the two elongated openings 120a and 120b, a mirror 123 slanted 45 degrees with respect to the axis is mounted to define an L-shaped optical path through the pin 120. A light emitting diode 122 mounted in a block 127 is tightly held in position by a securing plate 121. When a cassette CA is placed in a proper position, the pin 120 is inserted into a cylindrical hole formed in the cassette CA. A mirror 124 slanted 45 degrees to the axis of the cylindrical hole is previously fittingly provided in the cylindrical hole of the cassette CA, to direct light rays from the pin 120 in a direction parallel to the support plate 65. In the path of light rays from the mirror 124, a light receiving element 126 is mounted in a block 128 which is tightly held in a cassette holder 125 for receiving the cassette CA. Between the mirror 124 and the light receiving element 126, there is provided a conduit in the cassette, through which conduit the magnetic tape MT passes.

The magnetic tape consists of a magnetic tape portion and leading and trailing tape portions at opposite ends of the magnetic tape portion. The magnetic tape portion is non-transparent and the leading and trailing tape portions are transparent. Accordingly, when the magnetic tape portion is present in the conduit, the light receiving element 125 receives no light rays from the mirror 124. Contrary, when the leading or trailing tape portion is present in the conduit, the light receiving element 126 receives light and, thus, it produces a signal indicating the end of the magnetic tape.

A similar tape end detecting device is provided on the opposite side at 129 and 130 (FIG. 1).

Next, the operation of the mode setting arrangement is described.

Initially, the video tape recorder is in the stop mode in which the cam arrangement 1 is located in the position shown in FIG. 11a and, therefore, the various elements provided in association with the cam arrangement 1 are located in the position shown in FIG. 4. More particularly, the arm 2b of the idler control lever 2 is engaged in the recess 1b' of the cam 1b to hold the idler gear 102 in the neutral position and, at the same time, to give a braking effect to the reel bases 93 and 104 by the lever 105. The pinch roller control lever 4 is so positioned as to locate the pinch roller 79 adjacent the axle 7. The pin 5 extending from the sector shaped gear 15 is located adjacent the axle 7 to terminate the sector shaped gear 15 in the first position and, accordingly, the tape loading arrangements 51 and 52 are located in their initial position. And, the arm 3 is pushed upwardly by the cam 1b. Furthermore, the tension lever 84 is in such a position to locate the guide pin 83 between the pinch roller 79 and the post 63 when viewed in FIG. 4. In the stop mode, the cassette CA can be placed in a proper position in the video tape recorder as indicated by a chain line in FIG. 4, or can be extracted from the video tape recorder.

Figure 12:
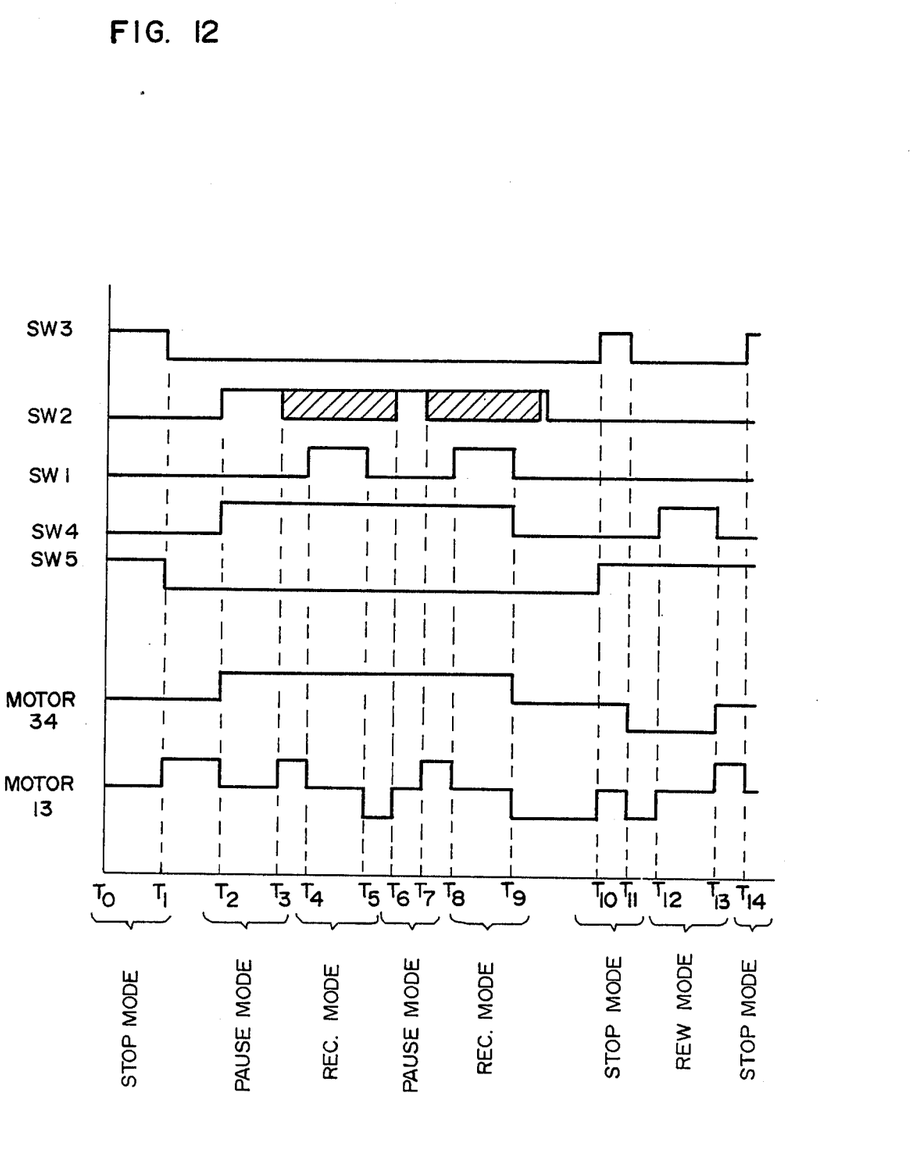
FIG. 12 is a time chart showing conditions of switches and motors employed in the mode setting arrangement of the present invention.

In the stop mode, the switches SW1, SW3, SW3, SW4 and SW5 are held, respectively, off, off, on, off, and on, as indicated in the time table of FIG. 12 at a moment T0.

It is to be noted that the signals produced from each of the switches SW1 to SW4 and various operation buttons are fed to a microcomputer (not shown) for controlling the sequence operation of the video tape recorder.

Then, at a moment T1, when a record button (not shown) is pressed, the loading motor 13 is switched on to rotate in one direction and, accordingly, the cam arrangement 1 starts to rotate counterclockwise for about 270 degrees until the cam arrangement 1 is set in the position shown in FIG. 11b for setting the video tape recorder in the pause mode. The set up of the pause mode completes at a moment T2 shown in FIG. 12.

In the time interval between the moments T1 and T2, the following sequence of operation is carried out.

First, the idler control lever 2 is so turned counterclockwise as to release the idler gear 102 from the neutral position and to release the reel bases 93 and 104 from the braked condition. Then, by the rotation of the sector shaped gear 15 counterclockwise, the tape loading arrangements 51 and 52 starts to move from the initial position, as shown in FIG. 4, towards the loaded position, as shown in FIG. 2 or 3. When the tape loading arrangements 51 and 52 are moved to about the end of the respective guide grooves 66 and 67, the pinch roller control lever 4 starts to rotate clockwise by the engagement of the lever 4 with the curved edge 1d–b of the cam 1d and, accordingly, the pinch roller 79 starts move from the position shown in FIG. 4 towards the capstan 41. Furthermore, by the rotation of the cylinder 22, the guide pin 83 mounted on the tension lever 84 moves almost in the synchronized manner with the pinch roller 79. Before the pinch roller 79 makes a pressure contact with the capstan 41, i.e., before the pinch roller control lever 4 engages the slope edge 1d–c of the cam 1d, the end 3b of the arm 3 engages the recess 1b' to turn the switch SW2 on to stop the loading motor 13. In addition to stop the loading motor 13, the signal produced from the switch SW2 at the moment T2 is used to start the motor (not shown) for driving the drum 117, the motor 39 for driving the capstan 41 and the motor 34 for driving the idler gear 102. Here, since the motor 34 is driven clockwise, the idler gear 102 tilts clockwise about the shaft 36 of the gear 103 to transmit the driving force from the motor 34 to the gear 104a.

As apparent from the foregoings, in the pause mode, loading arrangements 51 and 52 are located in the loaded position with a predetermined pressure applied against the respective V-shaped blocks 70 and 71, the pinch roller 79 is located closely adjacent the capstan with a predetermined space between the pinch roller 79 and the capstan 41, and the guide pin 83 is located in the position shown in FIG. 2. In the pause mode, the magnetic tape extracted from the cassette extends around the rotating drum 117, ready for recording.

Figure 11C:
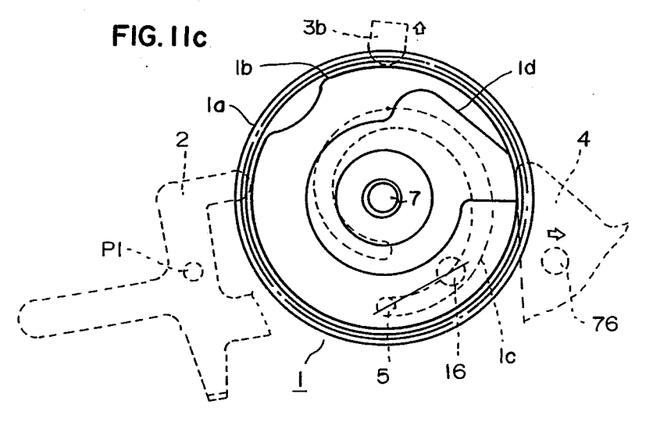

Then, at a moment T3, when a start button (not shown) is depressed, the loading motor 13 again rotates in said one direction to further rotate the cam arrangement 1 counterclockwise until the cam arrangement 1 is set in the position shown in FIG. 11c for setting the video tape recorder in the record/play mode (in this case record mode). The set up of the record mode completes at a moment T4 shown in FIG. 12.

In the time interval between the moments T3 and T4, the following sequence of operation is carried out.

By the further rotation of the loading motor 13 in said one direction, the pinch roller 4 further rotates clockwise, as it slides along the slope edge 1d-c of the cam 1d. Such a further clockwise rotation of the pinch roller control lever 4 accomplishes the pressure contact between the pinch roller 79 and the capstan 4. At the moment T4, the lever 4 contacts the summit edge 1d-d of the cam 1d for holding the pinch roller 79 in the pressure contact position and, at the same time, the arm 80 turns the switch SW1 on for stopping the loading motor 13. Accordingly, the magnetic tape held between the pinch roller 79 and the capstan 41 is advanced with a predetermined speed to carry out the recording. The recording continues until the start button is released.

Then, at a moment T5, when the start button is released, the loading motor 13 is actuated to rotate in a direction opposite to said one direction. Accordingly, the cam arrangement 1 starts to rotate clockwise until the cam arrangement 1 returns to the position shown in FIG. 11b for setting the video tape recorder again in the pause position. When the cam arrangement 1 is returned to the position shown in FIG. 11b, at a moment T6, the arm 3 turns the switch SW2 to stop the loading motor 13 and, thus, the video tape recorder is maintained in the pause mode.

Thereafter, at a moment T7, when the start button is again depressed, the cam arrangement 1 changes its position from that shown in FIG. 11b to that shown in FIG. 11c and, accordingly, at a moment T8, recording mode is set up again in the same manner described above, thereby further carrying out the recording.

Then, at a moment T9, when the magnetic tape portion ends and the trailing tape portion appears in the tape end detecting device, the tape end detecting device produces a signal indicating the tape end. Accordingly, the cam arrangement 1 rotates clockwise from the position shown in FIG. 11c to the initial position shown in FIG. 11a for setting the video tape recorder in the stop mode at moment T10. Therefore, the pinch roller 79 and the loading arrangements 51 and 52 are again located in the position shown in FIG. 4.

It is to be noted that the return from the record mode to the stop mode can be carried out manually by the step of releasing the record button and, thereafter depressing a stop button (not shown).

Figure 11D:
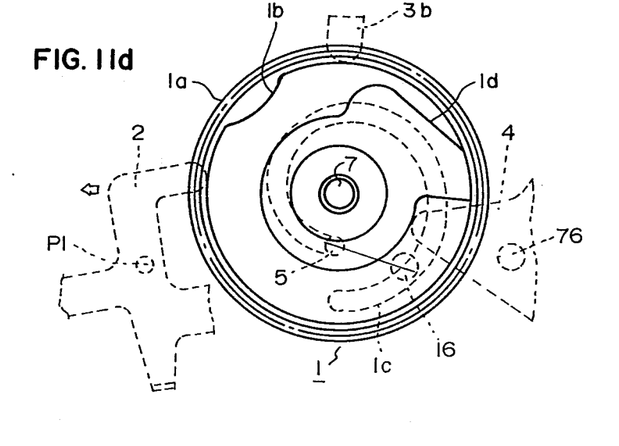

Next, at a moment T11, when a fast-rewind button (not shown) is depressed, the loading motor 13 starts to rotate in said opposite direction to rotate the cam arrangement 1 from the position shown in FIG. 11a to the position shown in FIG. 11d. When the cam arrangement 1 is rotated to the position shown in FIG. 11d, at a moment T12, the idler control lever 2 is rotated counterclockwise, but the pinch roller 79 and the loading arrangements 51 and 52 are maintained still. Accordingly, by the turning of the switch SW4 and no turning of the switch SW5, the motor 34 rotates in high speed to effect the fast-rewind of the magnetic tape. The fast rewind can be stopped manually or by the detection of leading tape portion by the tape end detecting device. When a signal for stopping the fast rewind is produced, the cam arrangement 1 returns from the position shown in FIG. 11d to the position shown in FIG. 11a, in a time interval between moments T13 and T14.

Next, when it is required to play the video tape recorder, a play button (not shown) is depressed. In this case, the cam arrangement 1 rotates counterclockwise from the position shown in FIG. 11a to the position shown in FIG. 11c without any stop. Accordingly, the pinch roller 79 is shifted at once to the position for effecting the pressure contact with the capstan 41.

According to the present invention, since the cam arrangement 1 driven by the loading motor 13 can set various modes of operations, it is not necessary to employ a solenoid device, which is according to the prior art provided for effecting the pressure contact of pinch roller against the capstan. Furthermore, it is not necessary to employ many complicated lever arrangements. Accordingly, a video tape recorder employing the mode setting arrangement of the present invention can be assembled in a compact size capable of being accommodated in a video camera.

Although the present invention has been fully described with reference to several preferred embodiments, may modifications and variations thereof will now be apparent to those skilled in the art, and the scope of the present invention is therefore to be limited not by the details of the preferred embodiments described above, but only by the terms of appended claims.

What is claimed is:

1. A tape loading mechanism for use in loading and unloading tape from a cassette in a video tape recording/playing device having: a support plate, a pair of tape loading means having a roller and a slanted post for guiding a tape portion; a pair of guide openings in said support plate for guiding said pair of tape loading means for movement between an unloading position, in which the tape portion is located inside said cassette, and a loading position, in which the tape portion is extracted from said cassette and wound around a drum; a loading motor for driving said pair of tape loading means; a cam member having a spiral guide groove formed therein, said cam member being rotatably mounted on said support plate and being rotated by said loading motor; a sector gear having a pin extending therefrom for engagement with said spiral guide groove, said sector gear being rotatably mounted on said support plate and being moved back and forth in association with the movement of said cam member for causing said pair of tape loading means to move between said unloading and loading positions; and a pair of gears rotatably mounted on shafts extending from said support plate, and pair of gears being rotated in opposite directions to each other in response to the movement of said sector gear, wherein an improvement comprises:

a first pair of arms each extending from one of said pair of gears; and a second pair of arms each having one end thereof pivotally connected to one of said first pair of arms and the other end thereof connected to one of said pair of tape loading means.

* * * * *